Sept. 20, 1949.　　　　M. M. SENSENICH　　　　2,482,375
PROCESS OF MANUFACTURING PLASTIC COATED
WOOD PROPELLERS OR IMPELLERS
Filed Nov. 22, 1944　　　　　　　　　　　2 Sheets-Sheet 1
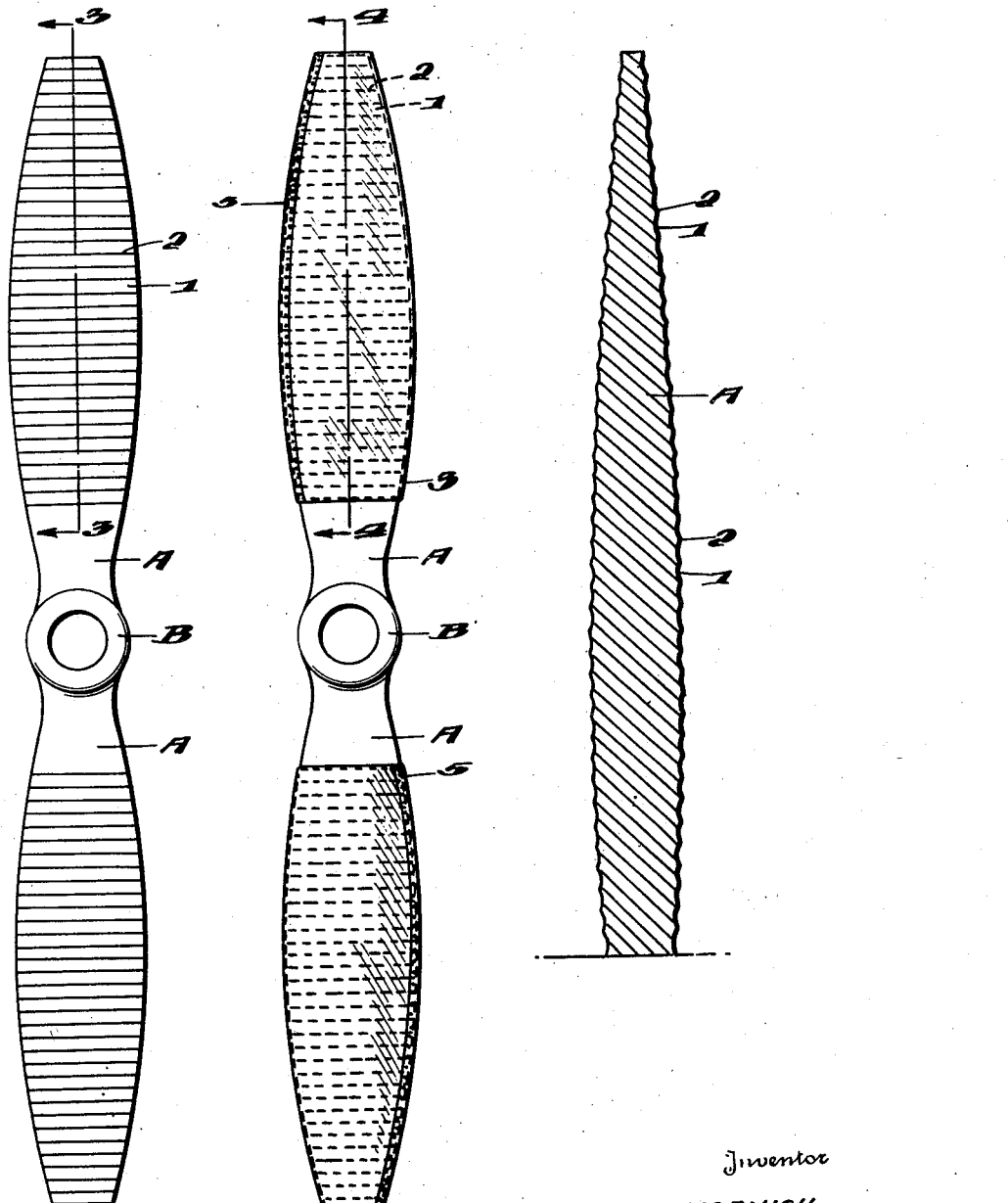
Inventor
MARTIN M. SENSENICH,
By Babcock + Babcock
Attorneys Sept. 20, 1949.  M. M. SENSENICH  2,482,375
PROCESS OF MANUFACTURING PLASTIC COATED
WOOD PROPELLERS OR IMPELLERS
Filed Nov. 22, 1944  2 Sheets-Sheet 2
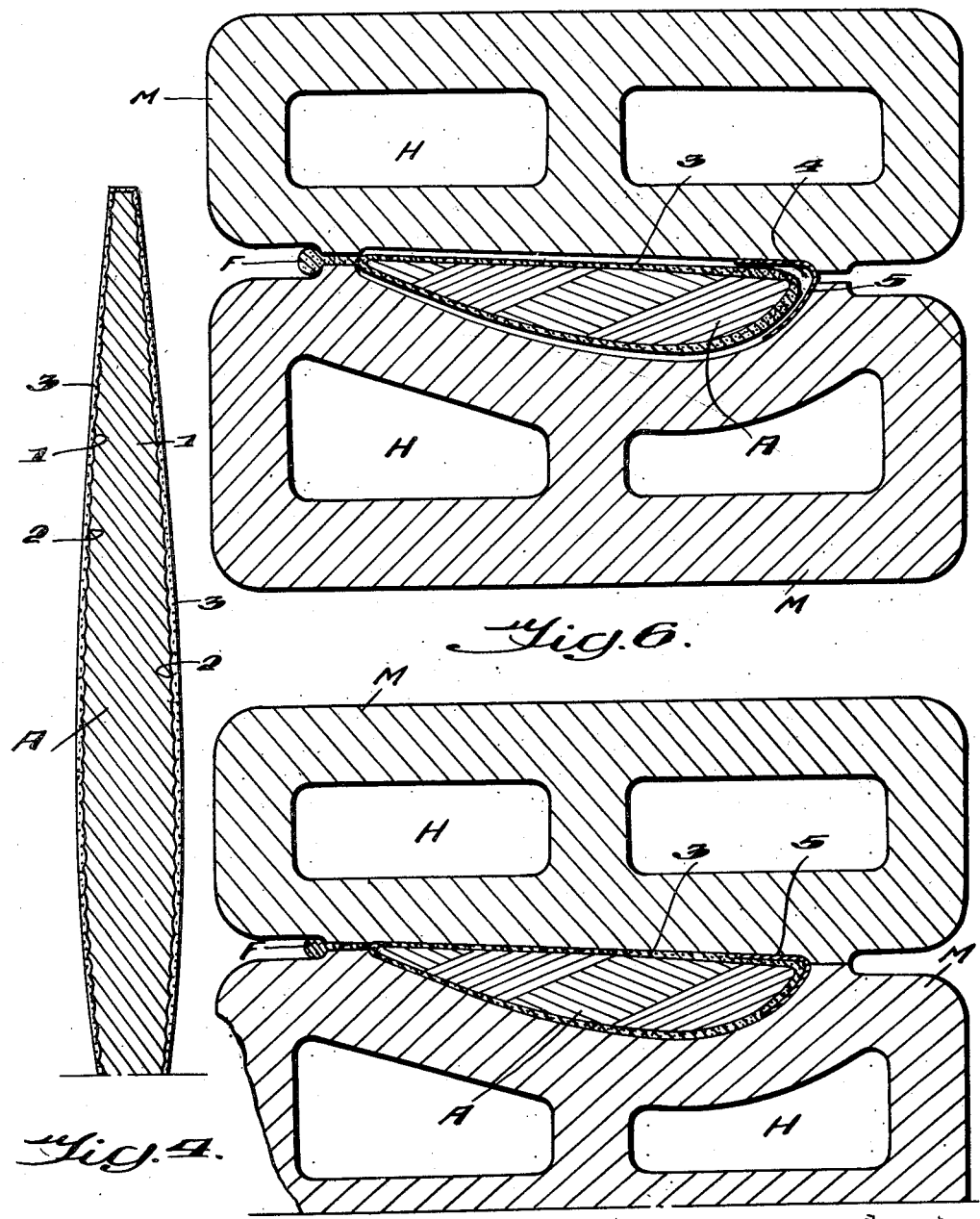

Patented Sept. 20, 1949

2,482,375

UNITED STATES PATENT OFFICE 2,482,375

PROCESS OF MANUFACTURING PLASTIC COATED WOOD PROPELLERS OR IMPELLERS

Martin M. Sensenich, Lancaster, Pa., assignor to Sensenich Corporation, Lancaster, Pa., a corporation of Pennsylvania Application November 22, 1944, Serial No. 564,672

5 Claims. (Cl. 154—132)

This invention relates to a process for the manufacture of plastic coated wooden propellers or impellers and to the product thereof, the presently intended primary field of use for which will be as propellers or airscrews for airplanes.

In general in the manufacture of such plastic covered propellers it has been the practice to clamp a laminated wood blank in a wood carving or profiling machine controlled by a pattern and cut or carve it to the desired form in the rough by means of rotating cutting means, either a single cutting wheel or a plurality of properly synchronized rotary cutters. As it leaves the carving or profiling machine it has a plurality of transversely extending hills and valleys or ridges and grooves formed by the cutters of the profiling machine, the axis or axes of said cutter or cutters usually extending approximately parallel to the longitudinal central line of the blank, so that the periphery or peripheries of the cutter or cutters engage and cut or gouge out the material of the blank over a narrow path usually extending transversely of the blank substantially at right angles to the longitudinal central line thereof. When the blade had been roughed out by the carving or profiling machine as above it was then operated upon to remove the extreme tip end of the blank which was engaged by the tail stock of the profiling machine, and thereafter the blade and its stem, root or hub were then smoothed by cutting, draw knives, scraping, and grinding or sanding operations, mostly time consuming and costly hand operations by expert operatives long experienced in this special work, until the desired high degree of smoothness and the desired form and balance or near balance had been attained. Thereafter the sheets of plastic, such as cellulose acetate, or other suitable plastic sheet material either of cellulose, or resin or other base and of such composition as to be suitable to the purpose was applied, usually by aid of heat and pressure and after first coating the wood surface with one or more bonding agents containing a solvent of the plastic sheet material selected for coating or sheathing purposes.

When the roughed out blade left the profiling machine it had a ridged and grooved surface, which surface was composed of the fibres of the wood in a loosened up uneven torn condition due to the cutting and tearing action thereon by the cutter wheel or wheels, so that the surface was made up of a great multiplicity of minute recesses and raised portions rather evenly or uniformly disposed over the area of each of the individual hills and valleys or ridges and grooves and also the pores of the wood were wide open and unobstructed, so that the rough surface of the roughed out blade was in ideal condition for deep penetration by a plastic coating or a priming or bonding agent, and for deep mechanical interlocking with a suitable thick plastic sheet coating or sheathing, which in the practice of coating such propellers with sheet plastic has been approximately forty one-thousandths of an inch thick over most of the blade or practically all of the blade except the edges where the sheeting has been lapped, and at those points, particularly the leading edge it will be thicker, the greater thickness at the leading edge being particularly desired to withstand the punishment it takes and it has been usual for the coating at or over the leading edge to be about double the thickness over the rest of the blade. However, the exact thickness of the coating would vary in accordance with the thickness of the sheets of plastic material used.

However, when the roughed out blade had been subsequently carved, scraped, ground and sanded to get it as smooth as practicable by such methods, the open ends of the pores were filled or closed by powdered wood, grit and the like incident to the grinding and sanding operations and the surface of the blade was smooth and tightly compact and relatively hard to penetrate and a definite mechanical interlock of the plastic sheet coating with the wood was difficult if not impossible to obtain.

The present invention has for its objects to provide a bond of greatly increased strength between the plastic coating and the wood of the propeller blade or blades; to eliminate the expense of smoothing the wood surface of the propeller blades after they are removed from the carving or profiling machine; to form the finished blade with a leading edge metal or armor strip and with perfect air-foil sections throughout the length of the effective part of the blade, the metal armor fairing perfectly into the plastic coating or sheathing.

In the accompanying drawings:

Figure 1 represents a plan view of a two blade integral type wooden propeller in roughed out state as it leaves the wood carving or profiling machine and after the wood blank tips have been cut from the tips of the blades and the roots of stems of the blade and the hub have been smoothed;

Figure 2, a similar view of a finished two-blade propeller;

Figure 3, a sectional view on the line 3—3 of Fig. 1, looking in the direction of the arrows, the illustration of the individual laminations being omitted;

Figure 4, a similar sectional view on line 4—4 of Fig. 2, looking in the direction of the arrows;

Figure 5, a cross-sectional view, broken away of one of the propeller blades shown in section in Figure 6 and taken at the same point as the section of Figure 6, showing the blade in its condition at the completion of the first molding operation and prior to the grinding or carving operation according to one mode of practicing the invention;

Figure 6, a cross-sectional view of one of the blades in the mold at the beginning of the second softening step or just prior thereto, with the leading edge of the plastic formed or reduced according to either one of the two methods mentioned to leave a space 4 between its leading edge and the opposed face portion of the armor strip 5, the spacing of the mold sections M, the plastic covered blade and the armor strip 5 being greatly exaggerated for clarity in showing the relative arrangement of the parts at the inception of the preliminary portion or softening step of the second molding operation or step; and Figure 7, a view similar to Fig. 6, after the second molding operation has been completed except for the opening of the mold and removal of the blade therefrom and with all opposed faces in contact.

In this invention I am not concerned with the composition of the particular solvent binding glue or bonding agent used, or with the particular base or composition or type of plastic sheeting used to coat or sheath the propeller blade or blades, nor with the details of construction or associations of the laminations of the wood propeller blade or of the laminated wood blank from which the wood core is cut or formed, all of these being usual and well known in the art, my invention being concerned simply with the process of manufacturing a propeller or impeller from the known laminated wood blank and sheathed or coated with any suitable usual known plastic sheet sheathing, and preferably including a metal armor strip for the leading edge of the propeller.

In the practice of my invention, a suitable laminated wood blank is inserted between the head and tail stocks, or otherwise held by suitable clamp or gripping means, of the usual template or pattern governed automatically operated usual known wood carving or profiling machine used in the art and wherein the wood blade core A is cut away by rotary cutters to the proper airfoil form in the rough or intermediate state, that is to say, the tip of the blank has to be cut away from the tip of the blade core A after removal from the carving or profiling machine, and the wood blade core A as it is removed from said carving or profiling machine has a rough and raw continuous undulating surface composed of alternating transversely extending grooves or valleys 1 separated from each other by ridges or hills 2 extending from the tip of the blade core A to the stem or root thereof or adjacent to the hub B, as shown in Fig. 1, said root or stem and said hub either being smoothed in the same or a different operation.

The said valleys 1 and hills or ridges 2 are formed by the peripheral faces of the cutting wheel or wheels and correspond in width and shape thereto and the fibres of the wood are more or less torn or spread or opened up or gouged out by the action of the rotary cutter or cutters, the axis or axes of which will usually be substantially perpendicular to the axis of the hub B or parallel or substantially parallel to the longitudinal central line of the wood blade core A being operated upon, and said cutter wheel or wheels and the wood blade core A are so positioned, relatively moved, and operated as to rough out the blade core A with a contour corresponding to that of the template or pattern or such as dictated thereby and, in so doing, to cut away the entire original surface of the wood blank except for the extreme tips thereof engaged by the stocks or other blank mounting, holding or clamping means, all in accordance with the usual known practice in the art.

Thereafter the blade core A is removed from the carving or profiling machine, the tip of the roughed out blade core A is cut away, and the blade stem or root, and the hub B in the case of a double blade propeller, if they have not already been smoothed and trimmed if necessary, are smoothed and finished preferably at the time the blank tip is removed from the tip of blade core A, though it will be understood that said root or stem and hub B in the case of a double blade propeller may be smoothed, trimmed and otherwise finished at any stage prior to the actual completion of the propeller, but such smoothing, trimming and finishing of such root or roots or stem or stems and hub B of the double blade propellers will be in accordance with present known practices and form no part of my present invention.

After the tip of the wood blank is cut or removed from the tip of blade core A, the roughed out blade core A shown in Figures 1 and 3 is coated with a solvent type glue, which contains a solvent of cellulose acetate, or a solvent of such other plastic sheet coating or sheathing material as may be employed for coating or sheathing the blade core A, and such coating of glue is allowed to dry.

While the said glue coating is drying a sheet of plastic material, which may be approximately 40/1000 of an inch thick, will be cut to form for each of the top and bottom cambers of the airfoil portion of blade core A and washed in a suitable solvent which may be, and preferably is, water diluted.

After the original glue coating applied to blade core A has dried, a further coating of the same glue is applied to the said blade core A. While I have said "same glue" above, it is not important that it be of exactly the same constituency or composition, and the second coating might be different either to the extent of containing a different proportion of solvent, or even to the extent of having a different base, different proportions, or a different solvent or differing in other respects so long as it is of such nature as to fuse, merge or cooperate with the first glue coating and the plastic sheet material in perfecting the bond of the plastic coating or sheathing with the wood core A.

After this second glue coating has become tacky, one sheet of plastic material 3 of the desired characteristics is placed in the lower section of a suitable mold M, the blade core A, as thus coated with glue, is then placed in the mold, the second sheet of plastic 3 is arranged on top of the blade core A in the mold M, the mold sections are then heated to between 100 to 200 degrees Fahrenheit in any suitable manner, as by passing steam into or through the heating or steam chambers H, the top section of the mold M is then lowered toward the bottom section and pressed toward the bottom mold section and against the intervening blade core A and the sheets of plastic 3 with a pressure of approximately 30 pounds per square inch as the initiating phase of a preliminary molding or plastic softening treatment, the temperature being built up to approximately 300 degrees Fahrenheit while said pressure is maintained and thereafter such pressure and the 300 degrees Fahrenheit are maintained until the material of the plastic sheeting or sheathing 3 has become so soft throughout as to be more susceptible to deflection than the wood core A so that on the initiation and during the maintenance of the primary molding operation the plastic material of the said sheeting or sheathing will flow under the increased pressure. Such softening will require a period of from five to ten minutes depending on the plastic material used and the degree of softness preferred.

At the end of the softening step or stage the 300 degrees Fahrenheit temperature or approximately that temperature is maintained and the pressure is increased to 200 pounds per square inch to force the opposed lips or faces of the mold into direct contact or practically so and to squeeze the coated and sheeted blade core A between them and cause the plastic material of the sheets 3 to flow to fill in irregularities in the surface of the wood core A and to mold itself externally to the form of the interior face of the cavity of the mold.

After the pressure has been increased to 200 pounds per square inch during the molding step as above mentioned, the pressure is held at approximately 200 pounds per square inch while the mold is cooled in any suitable manner, as by a flow of cold water through the steam or heating chambers H, until the temperature has decreased substantially and preferably to between 75 to 100 degrees Fahrenheit, when the pressure may be released and the coated propeller blade core A taken out of the mold.

It is not necessary that the mold be cooled down to between 100 to 75 degrees Fahrenheit before the pressure is released and the blade core A removed. The pressure might be released and the blade core A removed while the mold is at a higher temperature, particularly as it has still to go through another molding operation at the same, or substantially the same, temperatures and pressures. However, the lower the temperature of the mold at the time of release of pressure and removal of the blade, the harder is the plastic at such time, thus simplifying the next step of cutting the flash off of the leading edge and tip, and of carving or grinding off the leading edge to reduce its thickness and form from that shown in Figure 5 to that shown in Figure 6 to leave a space 4 between the forward face of the leading edge of the plastic sheathing 3 and the opposed inner or rear face of the extreme forward portion of the armor strip 5.

The flash F preferably is left on the trailing edge of the blade after the first molding operation until completion of the second molding operation as it aids in properly positioning the blade in the mold for the second molding operation, as shown in Figures 6 and 7.

It is essential that some provision, as by the space 4, be made to compensate during the second molding step for the added bulk of material in the shape of the armor strip 5 so that the same, as secured in position on the blade will be smooth and unwrinkled and not damaged for instance by being pinched between the lips of the mold sections M.

As the plastic material 3 is softened and put under pressure it will flow, such flow will start before the lips of the mold section contact and some of the plastic will be squeezed between the mold sections and prevent absolute contact between the mold sections M even at the end of the second molding step.

Unless there is some compensation by way of removal of plastic material or added space in the mold cavity according to the bulk of material in the armor strip 5, there is great probability that the plastic material will flow in between the leading edge of the wood core A and the armor strip 5 in such volume and under such pressure before the lips of the mold sections M have closely approached each other as to bulge or bend the armor strip 5 out between said lips of the mold sections to form a wrinkle in it extending into the space between said lips, which, as the step progresses, will move more closely together and pinch such bulge, bend or wrinkle between them, forming an irregularity destroying the fairing contour of the leading edge and which cannot be ground away or machined off, at least not in most instances, as to do so would be to grind through said armor or so nearly through the same as to greatly weaken and destroy the utility of such armor strip 5.

Accordingly, the sheathed blade blank is so formed in a suitable manner, prior to its introduction into the mold for the initiation of the second softening and molding steps, as to leave a compensating space 4 between the plastic coated leading edge of the blade blank and the opposed inner or rear face of the forward part of the armor strip 5, as shown in Figure 6.

Said sheathed blade blank may have its leading edge formed as above mentioned in any suitable convenient manner. One method is to take the blank as it is removed from the mold sections M and cut, carve or grind away the leading edge sufficiently to provide the space 4 where said blank is to be replaced in the same mold sections M for the second softening and molding steps.

Another method that might be used to form the leading edge so as to leave such a compensatory space 4 between it and the armor strip 5 at the initiation of the second softening and molding steps would be to use two molds or sets of molds, using one mold or set of molds for the first softening and molding steps, and the other mold or set of molds for the second softening and molding steps, the cavities in said molds or sets of molds being suitably slightly different so that the cavity in the second mold or second set of molds would be slightly larger and would result in producing the compensatory space 4 shown in Figure 6.

The employment of two molds, or two sets of molds, instead of performing the two softening and molding steps in the one mold or set of molds might involve a greater expense for molds, the difference in expense for molds decreasing as the volume of production and hence total number of molds increased and the saving in manufacturing costs increasing as the volume of production increased.

It is of no importance how or when the leading edge of the sheathed blade blank is formed so as to provide the space 4 between it and the armor strip 5 so long as said space 4 is provided or is present prior to or at the initiation of the second softening and molding steps.

With the first molding step or operation completed and the coated or sheathed blade blank or core with the flash removed from its leading edge and tip and with its leading edge formed as above mentioned to provide the space 4, the blank is placed in the lower section of the mold M with the flash F of the trailing edge fitting over the lip of said lower section of the mold and with metal or armor strip 5 separated by space 4 from the leading edge of the blank, as shown in Fig. 6, whereupon the upper mold section is lowered and the said sheathed or coated blade core or blank A and armor strip 5 are subjected to a heating and softening step under the same conditions of temperature, pressure and time as described wtih reference to the first preliminary molding or more truly plastic softening treatment step with the same object of softening the plasic 3 to a soft easily moldable condition and at the same time bring the armor or metal strip 5 to the same or substantially the same warm or hot temperature as the plastic 3, and after the completion of this second plastic softening step and with the temperature maintained at approximately 300 degrees Fahrenheit the pressure is increased from 30 pounds per square inch to 200 pounds per square inch or approximately to that pressure, to in substance repeat the first molding operation or step, with the exception that in this second molding operation the 300 degrees Fahrenheit temperature and approximately 200 pounds per square inch pressure are maintained for a period of from 15 to 20 minutes, where cellulose acetate sheet plastic is used, to thoroughly set the plastic coating, when the mold may be cooled as before described to a temperature of between 75 to 100 degrees Fahrenheit, and the blade then removed from the mold. Where other compositions of plastic sheeting are employed they may require suitable modifications in the temperatures, pressures and length of period of the pressure and heat treatment steps according to their bases and compositions as will be appreciated by those familiar with such plastic sheet materials and in particular with the particular plastic sheet material which may be selected for the purpose, and otherwise skilled in the art.

After the blade is removed from the mold after the second or final molding step or operation, the flash is removed from the edges of the blade, the blade is balanced in the usual manner, as by spraying a little more plastic material on the coating at such point or points as may be necessary to obtain a true balance, and thereafter, assuming if any plastic material has been sprayed on for balancing purposes that it has dried and hardened, the exterior face of the coating is polished in accordance with usual practice and with the completion of this step the blade is finished and ready for immediate use on an airplane or other aircraft or as an air impeller.

While the temperatures and pressures employed in the various pressure and heat treating steps may vary in accordance with the bases, compositions and natures of the plastic sheet material employed, and while economic factors may control as to whether one mold or set of molds of identical form and construction, or two molds or two sets of molds of slightly different form is or are employed, the essential unvarying features or steps of the process are the elimination of the smoothing of the blade or airfoil portion of the wood blade core A, the application thereto of the plastic sheet material 3 in its condition as roughed out by the carving or profiling machine and as coated with a suitable solvent glue or solvent agent; and, also, where a metal armor 5 is employed for the leading edge, the securing of such armor 5 in position close to the wood by a bond with the plastic and under conditions of heat, pressure and confinement such as to cause the plastic to flow between the wood core A and the opposed face of the armor 5 and exert a thrust against the armor 5 to force it against the opposed face of the mold and force the external face of the armor strip 5 to conform to the configuration of the opposed face of the mold, while avoiding wrinkling or pinching of the armor strip 5, and to mold the plastic material against or about the edges of the armor 5 so as to lie flush with the outer surface of the armor 5 at all points, so that the armor 5 fairs into the plastic perfectly at all points and the process as a whole results in the production of a blade having perfect airfoil sections throughout the blade.

While I have described the application of two coatings of solvent glue and while the use of two such coatings is preferred, this largely depends on the base, composition and character of the sheet material selected, the solvent glue used and the thickness of the coat or coatings applied, and the number of coatings may be only one or more than two according as the materials employed and the manner of application may dictate.

Also, while I have mentioned that the sheets of plastic material may be washed with a water diluted solvent while the solvent glue coating or coatings is or are drying, obviously they might be so treated at a different time and kept ready for use under suitable conditions where a suitable provision is made and a number of propellers are being processed together or continuously.

Also, it is not essential that as roughed out by the profiling machine the wood blade core A shall have the hills or ridges 1 and the grooves or valleys 2 so long as said core is taken directly from the profiling or carving machine with the surface fibres as torn and loosened up thereby and with the pores of the wood open and unobstructed and in that state is coated with the solvent glue or agent and thereafter sheathed with the plastic sheeting, it being recognized that some carving or profiling machines either now in use or possibly hereafter developed may form the blade core A in the rough without leaving such hills 1 and valleys 2.

The sheets of plastic material 3 should be of such size and form that as arranged on the cambers of the blade the two sheets may touch each other at all points about the edge around the tip and on both sides of the blade, or lap each other at all points about the tip and side edge on both sides of the blade, and such touching or lapping need only be to the extent of a few thousandths of an inch or even less so long as they touch or substantially touch at all points so that there will be sufficient plastic material to be molded to constitute a continuous thick skin over the airfoil portion of the blade. However, as a practical matter the sheets of plastic material 3 will normally be cut of such size and shape as to lap each other with a substantial marginal portion at all points about said tip and side edges to avoid necessity for minute precision in the manipulation and arrangement and positioning of said sheets.

I claim:

1. The process of manufacturing plastic coated wood propellers or impellers which comprises the following steps: roughing out a wood blade core with a tearing action; next, coating said core with a suitable glue comprising a solvent of the plastic sheet material to be used and allowing said glue to dry; next, coating said core with a glue having the above characteristic; next, while said last coating of glue is in a tacky condition, applying solvent washed sheets of plastic while damp to the top and bottom cambers of said core with their marginal portions lapping; next, confining said core and plastic sheets as thus arranged in a mold and subjecting them to a pressure of approximately 30 pounds per square inch and a temperature of approximately 300 degrees Fahrenheit for from five to ten minutes until the plastic material of said sheets softens to such degree that it is more susuceptible to deflection than the wood core; next, increasing the pressure to approximately 200 pounds per square inch while maintaining such temperature; next, cooling the mold to approximately 75 to 100 degrees Fahrenheit and removing the blade; next, removing the flash from the leading edge and tip of the blade; next, removing a portion of the plastic from the leading edge of the blade; next, placing the blade and an armor strip in the mold with the strip disposed over the leading edge of the blade; next, repeating the softening step; next, repeating the molding step and continuing the latter for a period of 15 to 20 minutes; next, repeating the cooling step and removing the blade from the mold; next, removing the flash from the blade; next, balancing the blade; and finally, polishing the exterior face of the blade plastic coating.

2. The process of manufacturing plastic coated wood propellers or impellers which comprises the following steps; roughing out a wood blade core with a tearing action; next, coating said core with a suitable glue comprising a solvent of the plastic sheet material to be used; next, applying solvent washed sheets of plastic while damp to the top and bottom cambers of said core with their marginal portions lapping and while the glue coating is tacky; next, confining said core and plastic sheets as thus arranged in a mold and subjecting them to a low pressure and such a temperature for such a time period as is necessary to soften the plastic material of such sheets to such degree that it is more susceptible to deflection than the wood core; next, while maintaining such temperature, increasing the pressure as a molding step to a high pressure sufficient to force the plastic material to flow to fill in the open pores and interstices in the wood surface and to take with its exterior face the form of the cavity of the mold; next, cooling the mold and removing the blade therefrom; next, removing the flash from the leading edge of the blade; next, removing a portion of the plastic from the leading edge of the blade; next, placing the blade and an armor strip in the mold with the strip disposed over the leading edge of the blade; next, repeating the softening step; next, repeating the molding step; next, repeating the cooling step and removing the blade from the mold; next, removing the flash from the blade; next, balancing the blade; and finally, polishing the plastic coating.

3. The process of manufacturing plastic coated wood propellers or impellers which comprises the following steps: roughing out a wood blade core with a tearing action; next, arranging said core in a suitable mold with solvent washed sheets of suitable plastic coating material applied in the presence of suitable intervening solvent containing priming material to the top and bottom cambers of said core with the marginal portions of said sheets lapping; next, confining said core and plastic sheets as thus arranged in said mold and subjecting them to a low pressure and such temperature for such time period as is necessary to soften the plastic material of said sheets to such degree that it is more susceptible to deflection than the wood core; next, increasing the pressure until said material flows while maintaining said temperature to mold said material into interlocking relation with the wood core and to take with its exterior face the form of the mold cavity; next, cooling the mold and removing the blade therefrom; next, removing a portion of the plastic from the leading edge of the blade; next, placing the blade and an armor strip in the mold with the strip disposed over the leading edge of the blade; next, repeating the softening step; next, repeating the molding step and continuing the latter for a period substantially in excess of the duration of a softening step; next, repeating the cooling step and removing the blade from the mold; next, removing the flash from the blade; next, balancing the blade; and finally, polishing the blade.

4. The process of manufacturing plastic coated wood propellers or impellers which comprises the following steps: roughing out a wood blade core with a tearing action; next, arranging said core in a suitable mold with solvent washed sheets of suitable plastic coating material applied in the presence of suitable intervening solvent containing priming material to the top and bottom cambers of said core with the marginal portions of such sheets lapping; next, confining said core and plastic sheets as thus arranged in said mold and subjecting them to a low pressure and such temperature for such time period as is necessary to soften the plastic material of said sheets to such degree that it is more susceptible to deflection than the wood core; next, increasing the pressure until said material flows while maintaining said temperature to mold said material into interlocking relation with the wood core and to take with its exterior face the form of the mold cavity; next, placing the blade and an armor strip for the leading edge of the blade in a mold with the strip disposed over the leading edge of the blade; next, repeating the softening step; next, repeating the molding step and continuing the latter for such a time period as is necessary to set the material of the particular composition of plastic sheeting employed.

5. The process of manufacturing plastic coated wood propellers or impellers which comprises the following steps: roughing out a wood blade core with a tearing action; next, arranging said core in a mold with solvent washed sheets of plastic coating material applied in the presence of intervening solvent containing priming material to the top and bottom cambers of said core with the marginal portions of such sheets lapping; next, confining said core and plastic sheets as thus arranged in said mold and subjecting them to a low pressure and such temperature for such time period as is necessary to soften the plastic material of said sheets to such degree that it is more susceptible to deflection than the wood core; next, while maintaining said temperature increasing the pressure until the material flows to mold said material into interlocking relation with the wood core and to take with its exterior face the form of the mold cavity and continuing such temperature and increased pressure for such time period as is necessary to set the material of the composition of the particular plastic sheeting employed; and next, cooling the mold and removing the blade therefrom.

MARTIN M. SENSENICH.

REFERENCES CITED

The following references are of record in the file of this patent:

UNITED STATES PATENTS

| Number | Name | Date |
|---|---|---|
| 892,702 | Wyman | July 7, 1908 |
| 1,444,959 | Dickey | Feb. 13, 1923 |
| 1,531,983 | Sawyer | Mar. 31, 1925 |
| 1,860,557 | Sukohl | May 31, 1932 |
| 2,073,528 | Safford | Mar. 9, 1937 |
| 2,263,792 | Wood | Nov. 25, 1941 |
| 2,276,004 | Vidal et al. | Mar. 10, 1942 |
| 2,350,345 | Freedman et al. | June 6, 1944 |

FOREIGN PATENTS

| Number | Country | Date |
|---|---|---|
| 412,300 | Great Britain | June 28, 1934 |
| 430,383 | Great Britain | June 18, 1935 |

OTHER REFERENCES

S. A. E. Journal of June, 1939, publication office at 56 and Chestnut Streets, Philadelphia, Pa., vol. 44, No. 6, pages 252 to 258.